B. C. HAMM.
TREAD FOR RESILIENT TIRES.
APPLICATION FILED MAY 26, 1916.
1,210,933.
Patented Jan. 2, 1917.
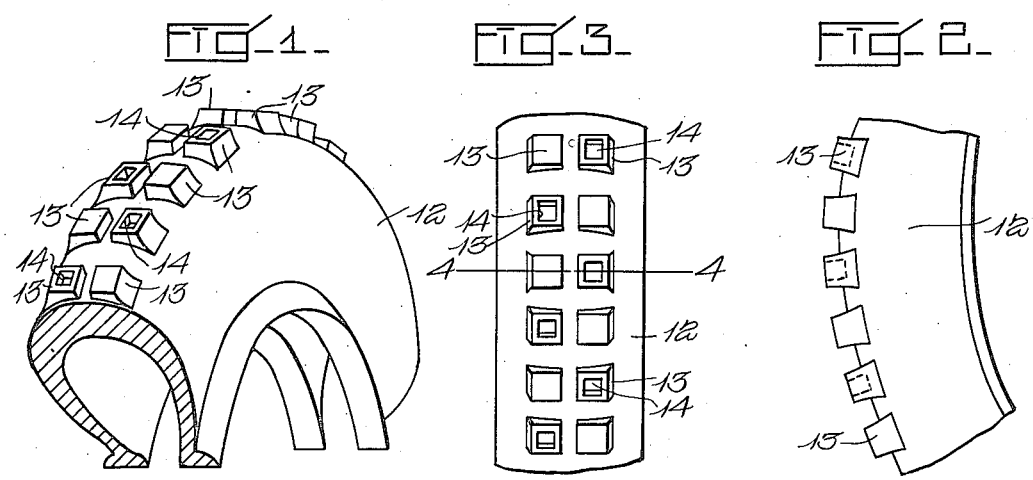
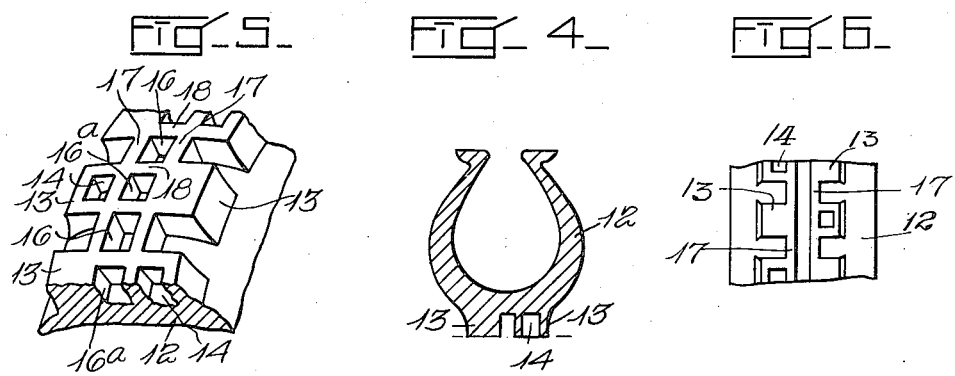
INVENTOR=
B_C_HAMM
by
ATTORNEYS

UNITED STATES PATENT OFFICE.

BERTRAM C. HAMM, OF BOSTON, MASSACHUSETTS.

TREAD FOR RESILIENT TIRES.

1,210,933.　　　　Specification of Letters Patent.　　Patented Jan. 2, 1917.

Application filed May 26, 1916. Serial No. 99,998.

*To all whom it may concern:*

Be it known that I, BERTRAM C. HAMM, a citizen of the United States, residing at Boston, Dorchester District, in the county of Suffolk and State of Massachusetts, have invented new and useful Improvements in Treads for Resilient Tires, of which the following is a specification.

This invention relates to resilient tires, particularly for the wheels of motor vehicles, and has for its object to provide an improved tread construction adapted to minimize the liability of slipping and skidding.

The invention is embodied in the improvements which I will now proceed to describe and claim.

Of the accompanying drawings forming a part of this specification, Figure 1 represents a perspective view of a portion of a tire body or shoe embodying my invention; Fig. 2 represents a side view of a portion of said shoe; Fig. 3 represents a front elevation of the portion shown by Fig. 2; Fig. 4 represents a section on line 4—4 of Fig. 3; Fig. 5 represents a fragmentary perspective view, showing supplemental suction cups; Fig. 6 is an elevation showing a modification of the structure represented by Fig. 5.

The same reference characters indicate the same or similar parts in all the views.

My invention is shown for purposes of illustration in connection with that portion of a resilient tire body known as the shoe or carcass 12 which incloses an inflatable inner tube, but it will be understood that the invention is applicable to resilient tire bodies otherwise constructed.

In carrying out my invention I form on the outer surface of the tire body a multiplicity of outwardly projecting radial studs 13, said studs being integral with the body and therefore of resilient material. The studs are arranged in a plurality of peripheral rows, two rows being here shown, although there may be more than two if desired. Each stud is in transverse alinement with a stud of the other row, so that when there are two rows the studs are arranged in pairs, the studs of each pair being arranged to bear simultaneously on the road. If three rows are employed the simultaneously acting studs will be arranged three abreast. Some of the studs are solid and each of the other studs is provided with a cavity 14, these studs being therefore hollow and constituting suction studs. Each stud has a flat tread face which is in the same plane with the tread face of the stud transversely alined therewith, so that the tread faces of the simultaneously acting studs are adapted to have an extended bearing on the road, the entire tread surface of each stud conforming to the road, as indicated by Fig. 4. The solid and hollow studs preferably alternate in each row, and the hollow studs of each row are preferably staggered relatively to the hollow studs of the other row, so that each pair of transversely alined simultaneously acting studs includes a solid stud and a hollow stud. The hollow studs act to grip the track by suction and thus resist slipping and skidding. The solid studs located beside or abreast of the hollow studs, by reason of their relative stiffness and stability, compensate for the relative flexibility or instability of the hollow studs and prevent excessive displacement and distortion of the latter. In consequence of the staggered relation of the solid and hollow studs the studs of each row are alternately hollow and solid, the solid studs of each row compensating for the instability of the hollow studs of the same row and preventing excessive displacement and distortion of the hollow studs. The studs of each peripheral row are preferably separated by spaces which are narrower than the width of the studs, so that the transversely alined studs succeed each other in engaging the track without causing appreciable jolts or jars. The spaces between the transversely alined studs are preferably narrower than the spaces between the studs of each row.

Fig. 5 shows a construction providing suction cups 16 and 16ª supplementing the suction studs. The cups 16 are formed by elastic longitudinal webs 17 connecting the studs of each row, and lateral webs 18 connecting the transversely alined studs, the outer edges of said webs being flush with the tread faces of the studs. The cups 16ª are formed by the lateral webs 18 and the adjacent sides of the transversely alined studs.

The longitudinal webs 17 may be employed without the transverse webs 18, as shown by Fig. 6, the webs 17 increasing the resistance to skidding without forming suction cup walls. Said webs interposed as shown between the alternating solid and hollow studs serve to brace and strengthen the latter.

Having described my invention, I claim:

1. A resilient tire body having integral resilient studs projecting radially from its external surface and arranged in a plurality of peripheral rows, the studs of each row being in transverse alinement with the studs of the other row, and each stud having a flat tread face in the same plane with the tread face of the stud transversely alined therewith, the alternate studs of each row being hollow and constituting suction studs while the other studs are solid, and compensate for the relative flexibility of the hollow studs.

2. A resilient tire body having integral resilient studs projecting radially from its external surface and arranged in a plurality of peripheral rows, the studs of each row being in transverse alinement with the studs of the other row, and each stud having a flat tread face in the same plane with the tread face of the stud transversely alined therewith, the alternate studs of each row being hollow and constituting suction studs and the other studs being solid, the suction studs of each row being staggered relatively to those of the other row, so that the solid studs compensate for the relative flexibility of the hollow studs.

3. A resilient tire body having integral resilient studs projecting radially from its external surface and arranged in a plurality of peripheral rows, the studs of each row being in transverse alinement with the studs of the other row, each stud having a flat outer tread face in the same plane with the tread face of the stud transversely alined therewith, some of the studs being solid while others are hollow and constitute suction studs, and elastic webs connecting the transversely alined studs and the adjacent studs of each row, said webs forming walls of suction cups supplementing the suction studs.

4. A resilient tire body having integral resilient studs projecting radially from its external surface and arranged in a plurality of peripheral rows, the studs of each row being in transverse alinement with the studs of the other row, each stud having a flat outer tread face in the same plane with the tread face of the stud transversely alined therewith, the alternate studs of each row being solid while the others are hollow and constitute suction studs, the suction studs of each row being staggered relatively to those of the other row, and elastic anti-skidding webs connecting the adjacent studs of each row, and serving to brace the hollow studs.

In testimony whereof I have affixed my signature.

BERTRAM C. HAMM.